United States Patent [19]
Hoffman et al.

[11] Patent Number: 5,297,667
[45] Date of Patent: Mar. 29, 1994

[54] SYSTEM FOR STABILIZING ARTICLES ON CONVEYORS

[75] Inventors: Philip L. Hoffman; David A. Welbon, both of Medford; Richard J. Signorello, Grants Pass, all of Oreg.

[73] Assignee: Simco/Ramic Corporation, Medford, Oreg.

[21] Appl. No.: 974,410

[22] Filed: Nov. 12, 1992

[51] Int. Cl.⁵ .............................................. B65G 47/22
[52] U.S. Cl. ................................. 198/493; 198/836.2
[58] Field of Search ............ 198/493, 380, 434, 836.2, 198/689.1

[56] References Cited

U.S. PATENT DOCUMENTS

| | | | |
|---|---|---|---|
| 1,547,743 | 7/1925 | Fowler . | |
| 3,101,832 | 8/1963 | Wyle et al. | 198/380 |
| 3,198,352 | 8/1965 | Puechberty | 198/493 |
| 3,352,404 | 11/1967 | Settembrini | 198/689.1 |
| 3,471,013 | 10/1969 | Haver | 198/493 |
| 3,603,645 | 9/1971 | Hardy | 302/2 |
| 3,650,369 | 3/1972 | Vergobbi | 198/33 AA |
| 3,800,936 | 4/1974 | Anfossi | 198/493 |
| 4,093,062 | 6/1978 | Sjogren | 198/380 |
| 4,102,056 | 7/1978 | Angelo et al. | 34/10 |
| 4,505,371 | 3/1985 | Krueger et al. | 198/493 |
| 4,609,108 | 9/1986 | Hristozov et al. | 198/493 |
| 5,048,674 | 9/1991 | Wilbur et al. | 198/836.2 |
| 5,092,526 | 3/1992 | Takata | 239/655 |

FOREIGN PATENT DOCUMENTS

| | | | |
|---|---|---|---|
| 1050992 | 10/1983 | U.S.S.R. | 198/493 |
| 1411228 | 7/1988 | U.S.S.R. | 198/493 |

Primary Examiner—Joseph E. Valenza
Attorney, Agent, or Firm—Stoel Rives Boley Jones & Grey

[57] ABSTRACT

A stabilizing system stabilizes articles carried on conveyors for automated bulk processing equipment. In a preferred embodiment, a flow of gas (e.g., air) is projected along a conveyor belt in a direction generally parallel to that in which articles are carried by the belt. The air flow has a velocity (i.e., speed and direction) substantially the same as that of the belt to reduce aerodynamic resistance that would otherwise bear against the articles. As a result, the articles may be transported on the conveyor belt at high speeds with substantially increased stability or throughput.

17 Claims, 9 Drawing Sheets

SYSTEM FOR STABILIZING ARTICLES ON CONVEYORS

TECHNICAL FIELD

The present invention relates to conveyor systems for automated bulk processing equipment and, in particular, to systems for stabilizing articles carried by such systems.

BACKGROUND OF THE INVENTION

Automated bulk optical processing equipment can perform a variety of tasks such as, for example, inspecting or sorting bulk articles including raw or processed fruit, vegetables, wood chips, recycled plastics and other similar products. The articles may be characterized according to size, color, shape or other qualities. Modern bulk optical processing equipment can rapidly separate very large quantities of articles into numerous categories.

Such equipment typically includes a conveyor system that moves the articles past an inspection station where cameras or other detection devices examine the articles. The inspection station sends signals to a sorting or treatment station where the articles are sorted or otherwise treated by category. For example, defective or foreign articles may be removed from the flow of articles carried by the conveyor system.

Rapid inspection or sorting of large quantities of articles typically requires high-speed conveyor systems such as, for example, conveyor belts with widths of 3-4 ft (1-1.3 m) and that carry articles at speeds of over 10 ft/sec (3 m/sec). A problem with conveyor systems driven at such speeds is that many articles are relatively unstable on the belts and tend to roll, tumble, bounce and collide with each other. Unstable articles carried by a high-speed conveyor system are difficult to inspect, sort or otherwise process for at least two reasons.

First, automated bulk optical processing equipment includes cameras or other optical detectors that optically determine selected characteristics of the articles (e.g., size, color or shape). The rolling, tumbling or bouncing of an article typically diminishes the clarity with which an image of the article is generated, thereby decreasing the accuracy and reliability of the optical information about the article. As extreme examples, rolling could cause a cubic article to appear round or an article with regions of two different colors to be of a single mixed color.

Second, unstable articles moving on a conveyor belt can move laterally across the belt or along the belt in its direction of travel. Lateral movement of the articles is undesirable because it misaligns the articles as they pass from the inspection station to the processing station, thereby resulting in incorrect processing. Similarly, articles that move along the belt in its direction of travel have different effective speeds along the belt and may be temporally misaligned for subsequent processing operations.

Some articles have increased susceptibility to unstable motion on a conveyor, such as light-weight articles and articles of low and non-uniform density (e.g., wood and bark chips). As a consequence, these types of articles are correspondingly difficult to inspect and sort accurately at high speeds.

To decrease the instability of articles resulting in image degradation and processing errors, some conveyor systems operate at reduced speeds or have greater lengths. Such systems are undesirable because the reduced speeds result in lower processing rates and the conveyor systems of greater length can limit the placement of such systems.

SUMMARY OF THE INVENTION

An object of the present invention is, therefore, to provide an improved conveyor for use with automated bulk processing equipment.

Another object of this invention is to increase stability of articles carried by such conveyors.

A further object of this invention is to provide such a conveyor that is capable of allowing increased accuracy in optical processing of light-weight articles and articles of low and non-uniform density.

Yet another object of this invention is to provide such a conveyor that is capable of allowing increased accuracy in optical processing at high conveyor speeds and over shorter conveyor lengths.

The present invention includes a stabilizing system for stabilizing articles carried on conveyors for automated bulk processing equipment. In a preferred embodiment, a flow of gas (e.g., air) is projected along a conveyor belt in a direction generally parallel to that in which articles are carried by the belt. The air flow has a velocity (i.e., speed and direction) substantially the same as that of the belt to reduce aerodynamic resistance that would otherwise bear against the articles. As a result, the articles may be transported on the conveyor belt at high speeds with substantially increased stability.

In a conventional conveyor system not employing the air assisted stabilizing system of the present invention, only a very thin boundary layer of air travels at or near the speed of the conveyor belt. For a smooth conveyor belt, the boundary layer typically extends a few millimeters above the belt. Articles with thicknesses greater than a few millimeters extend through the boundary layer to slower or generally stagnant air. As a consequence, the articles or portions of them can be retarded by the slower-moving air, thereby destabilizing the articles on the belt and causing them to roll, tumble, bounce or collide with each other.

An air-assisted conveyor of the present invention includes an air flow of sufficient depth and velocity to stabilize articles carried by the conveyor. In a first embodiment, the stabilizing system includes a tunnel along which the conveyor belt runs with a flow of assisting air. Such a tunnel channels the assisting air flow over the conveyor belt to stabilize the articles for a relatively long period. This embodiment is desirable for providing maximum stabilization of articles while they are optically inspected or otherwise processed.

In a second embodiment that may be used alone or with the first embodiment, a flow of assisting air is generated along an article infeed apparatus that delivers the articles to a moving conveyor. As a result, the articles are deposited on the conveyor with an assisting envelope of flowing air that helps accelerate the articles to the speed of the conveyor, thereby allowing for a conveyor of shorter length.

Additional objects and advantages of the present invention will be apparent from the following detailed description of preferred embodiments thereof, which proceeds with reference to the accompanying drawings.

DETAILED DESCRIPTION OF PREFERRED EMBODIMENTS

Figure 1:
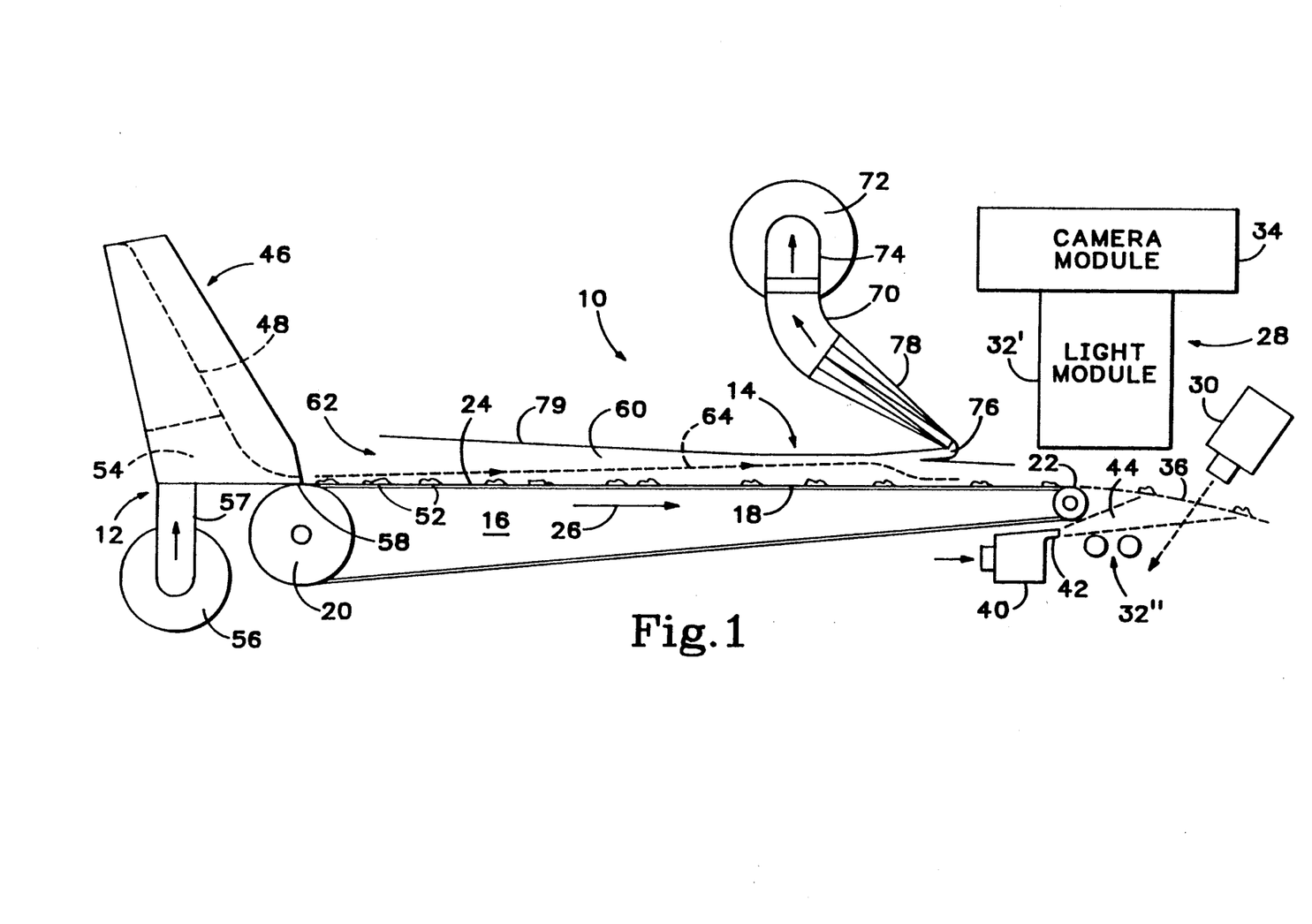
FIG. 1 is a schematic side view of an automated bulk processing system with two embodiments of a stabilizing system of the present invention.

FIG. 1 shows an automated bulk optical processing system 10 having a first stabilizing system 12 and a second stabilizing system 14 of the present invention for stabilizing articles carried by a conveyor 16. Processing system 10 preferably performs optical inspection of large quantities of bulk articles such as, for example, raw or processed fruit, vegetables, wood chips or recycled plastics. It will be appreciated, however, that stabilizing systems 12 and 14 could be similarly employed by other types of automated processing equipment such as, for example, packaging systems. Moreover, although being shown in use together in processing system 10, stabilizing systems 12 and 14 could alternatively be employed separately.

Conveyor 16 includes a belt 18 that forms a closed loop around a drive roller 20 and a spaced-apart, free-running end roller 22. A motor (not shown) coupled to drive roller 20 drives an upper surface 24 of belt 18 at a velocity in a direction 26 toward an optical inspection station 28 and a sorting station 30.

Inspection station 28 includes a pair of light modules 32' and 32Δ that cooperate with a camera module 34 to identify selected optical characteristics of the articles as they pass from belt 18. Inspection station 28 can identify the preselected characteristics of the articles in accordance with the methods and systems described in U.S. Pat. No. 5,085,325 of Jones et al. for Color Sorting System and Method, assigned to the assignee of the present application. Although inspection station 28 is shown as illuminating and inspecting articles after they pass from belt 18 (i.e., off-belt operation), stabilizing systems 12 and 14 are also useful in inspection systems that employ on-belt inspection.

Sorting station 30 employs pressurized air to divert selected articles projected along a normal trajectory 36 extending from belt 18. An air curtain unit 40 having an adjustable nozzle 42 is positioned below end roller 22 and directs an air flow 44 toward normal trajectory 36. Air flow 44 functions to support relatively small or light articles within normal trajectory 36 with articles that are larger or heavier, thereby allowing sorting station 30 to sort articles of various sizes or weights with generally uniform accuracy.

More specifically, an incidental boundary layer of air (not shown) moves with belt 18 as it passes downward around end roller 22. This boundary layer of moving air can direct smaller and lighter articles out of normal trajectory 36. Air flow 44 formed by air curtain unit 40 offsets the effect of the incidental boundary layer on smaller or lighter articles to improve the accuracy of sorting station 30. In addition, air flow 44 reduces the amount of dust carried by the boundary layer of flowing air toward light module 32Δ and along belt 18, thereby improving the cleanliness and efficiency of light module 32''. This feature is particularly advantageous for dusty articles such as, for example, wood chips.

Articles are delivered to belt 18 by an infeed system 46. Infeed system 46 is shown as having a curved chute 48 down which articles slide to be accelerated to about the speed of belt 18. The articles slide off a lower end 50 of chute 48 and drop onto belt 18. Infeed system 46 could alternatively employ an infeed conveyor belt, inactive chute or a vibrating chute.

Air assist system 12 helps to accelerate the articles dropping from chute 48 to the speed of belt 18 by generating a flow 52 of fluid, preferably a readily available gas such as air, that passes between belt 18 and lower end 50 of chute 48. Air flow 52 engages the articles as they drop from chute 48 onto belt 18 and functions to accelerate the articles to the velocity of belt 18. Air flow 52 has a velocity that may but need not be equal to the velocity of belt 18. After the articles are accelerated to the velocity of belt 18, air flow 52 functions to stabilize the articles on belt 18.

More specifically, the articles dropped onto belt 18 from chute 48 would typically bounce, tumble and roll, thereby requiring a length of belt 18 to allow the articles to settle into moderately stable positions thereon. Stabilizing system 12 settles the articles onto belt 18 much more quickly, thereby allowing belt 18 to be shortened and processing system 10 to be more compact or allowing conveyor 10 to increase product flow with the same stability and greater throughput of process.

Stabilizing system 12 employs a chamber or plenum 54 that receives air under pressure from a blower 56 via a conduit 57. A nozzle 58 in plenum 54 is positioned below and extends across chute 48 and belt 18 to provide a generally smooth flow 52 of air for stabilizing the articles. Belt 18 carries the articles to stabilizing system 14 where they are further stabilized before passing through optical inspection station 28.

Stabilizing system 14 includes a tunnel 60 that generally encloses upper surface 24 of belt 18 as it extends from a tunnel entrance 62 to optical inspection station 28. Tunnel 60 allows stabilizing system 14 to generate a flow 64 of fluid, preferably a readily available gas such as air, that passes over a substantial length 66 of belt 18. Stabilizing system 14 generates air flow 64 in a manner substantially opposite that employed by system 12.

Figure 2A:
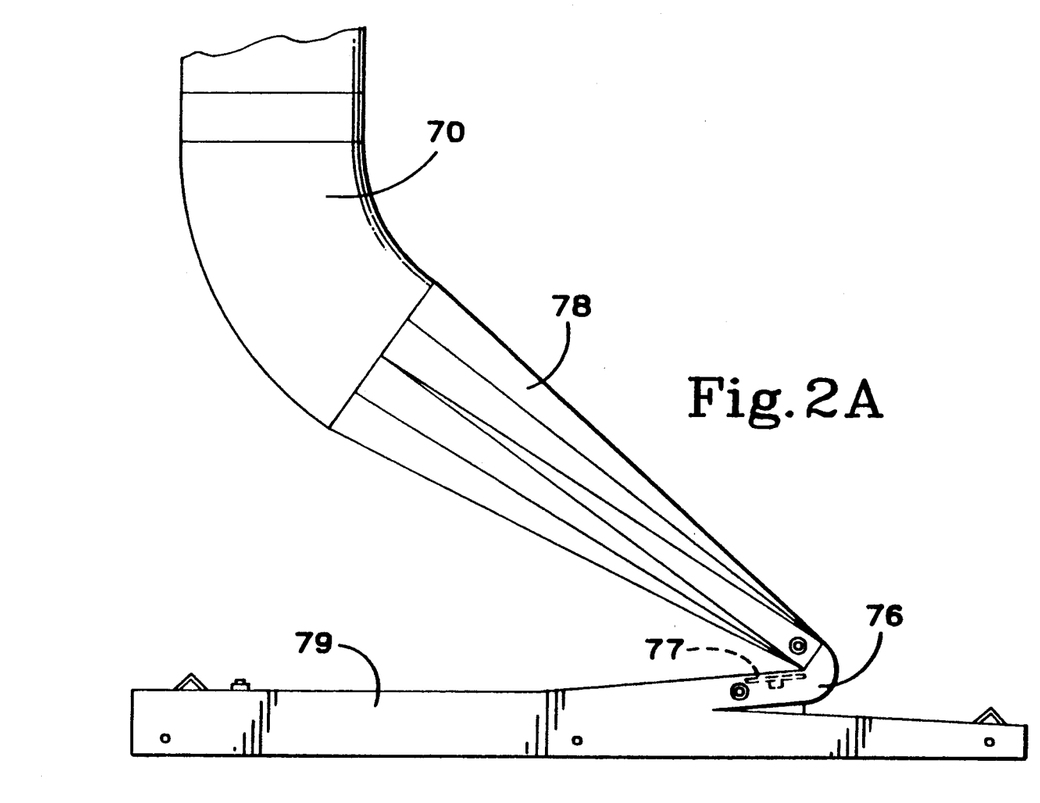
FIGS. 2A and 2B are respective side and plan views of components of a first stabilizing system shown in FIG. 1.
Figure 2B:
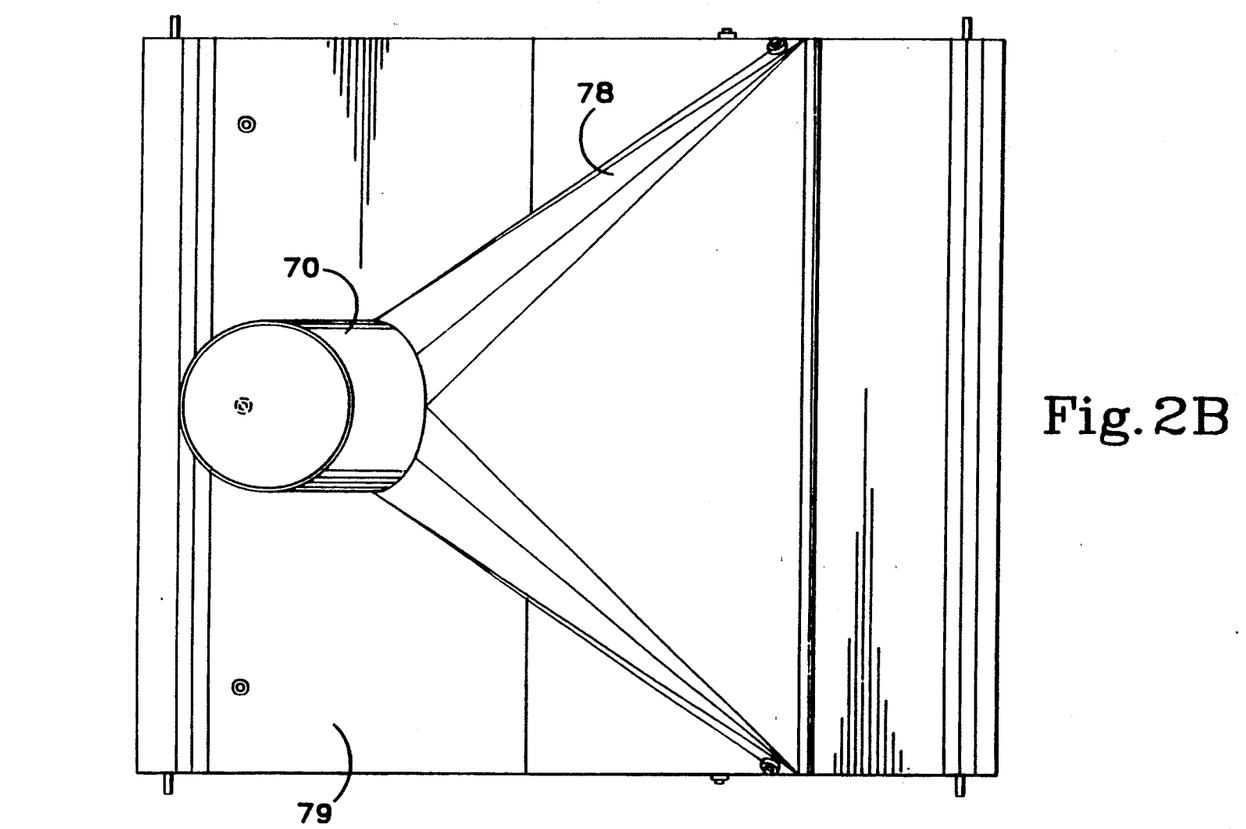

With reference to FIGS. 1, 2A and 2B, stabilizing system 14 employs a suction tube 70 through which air is drawn out of tunnel 60 by a blower 72 coupled via a conduit 74. An adjustable distribution slot 76 and its slidable adjustment plate 77 are positioned above and extending completely across belt 18 is connected to suction tube 70 via a tapered conduit 78 and allows blower 72 to draw air into tunnel entrance 62 and along tunnel 60 to provide a generally smooth air flow 64 for stabilizing the articles. Moreover, blower 72 draws dust from the articles and thereby reduces the amount of dust that passes over inspection station 28 to improve its operation.

Tunnel 60 is formed by a hood 79 positioned over and extending along belt 18. Air flow 64 induces an air draft along tunnel entrance 62 so that the articles carried on belt 18 are gradually stabilized by air flows of increasing velocity. Stabilizing system 14 stabilizes the articles carried on belt 18 so that they are substantially stable as they pass through inspection station 28 and sorting station 30.

Figure 3:
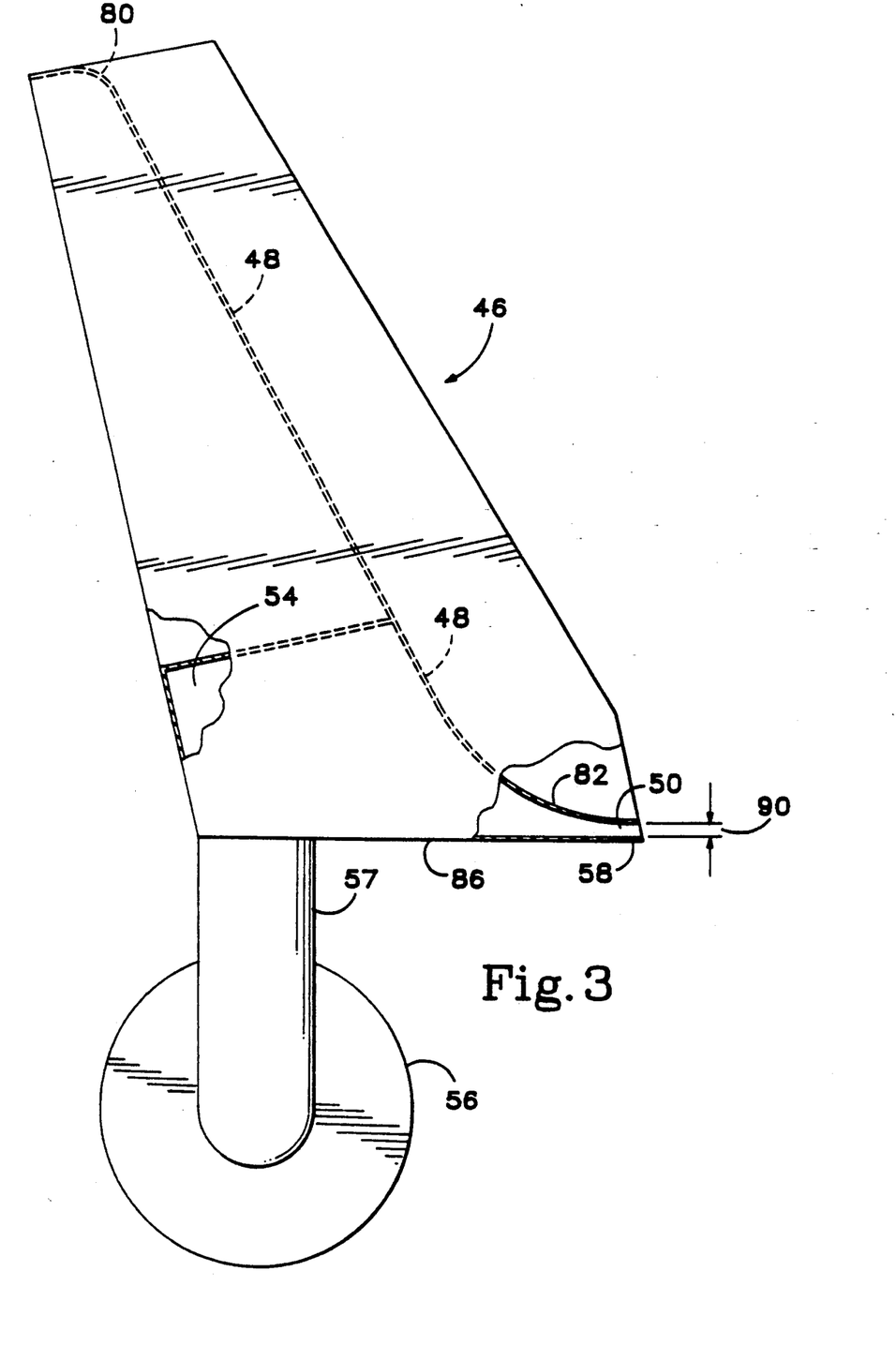
FIG. 3 is a sectional side view of an infeed chute and associated components of a second stabilizing system shown in FIG. 1.

FIG. 3 is a side view of infeed system 46, which receives the articles at a receiving edge 80 of chute 48 from an infeed shaker (not shown). The articles are accelerated by gravity as they slide along chute 48 through a bend 82 toward lower end 50. Chamber or plenum 54 is positioned below chute 48 and receives air under pressure from blower 56. Bend 82 in chute 48 cooperates with a slanted bottom surface 86 of plenum 84 to form nozzle 58, which extends across the width of belt 18. In a preferred embodiment, nozzle 58 forms an opening with a height 90 of about 0.25 in (0.5 cm).

Figures 4A, 4B:
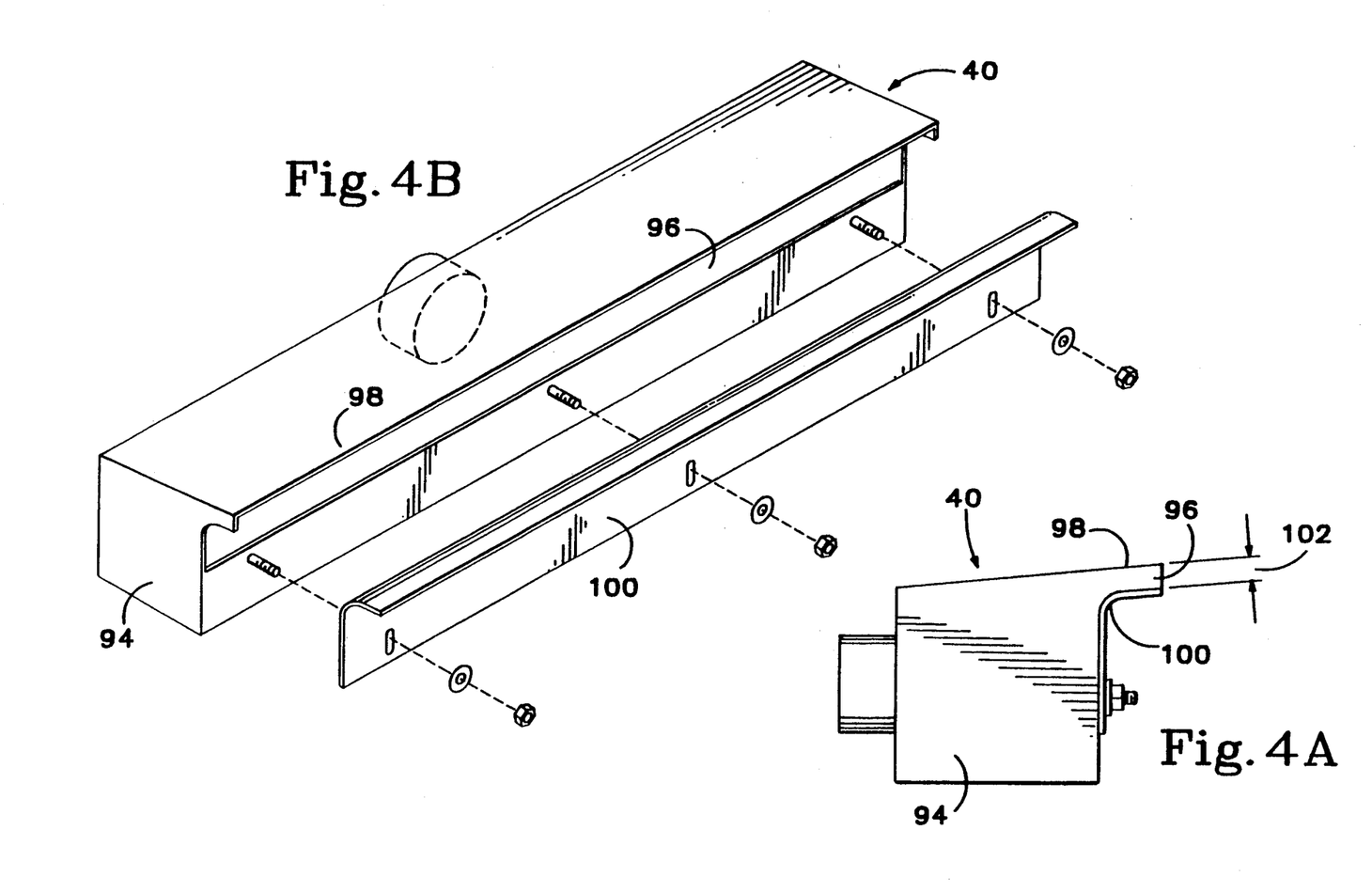
FIG. 4A and 4B are respective side and exploded isometric views of an air curtain unit employed in the system of claim 1.

FIGS. 4A and 4B are respective side and exploded isometric views of air curtain unit 40 positioned below end roller 22. A chamber or plenum 94 with an adjustable nozzle 96 that extends across belt 18 receives air under pressure from a blower (not shown). More specifically, plenum 94 includes a slanted upper lip 98 positioned opposite a curved lower lip 100 that is slidable vertically to adjust the volume and velocity of air flow 44.

In a preferred embodiment, processing system 10 processes wood chips with belt 18 having a width of 4 ft (1.3 m) and driven at a speed of 1200 ft/min (6 m/sec). Blower 72 draws air from tunnel 60 at a rate of about 1200 ft$^3$/min (standard) (10.4 m$^3$/min) Stabilizing system 12 with nozzle 50 having a height 90 through which air flow 52 is driven at 4000 ft/min 20 m/sec displaces about 267 ft$^3$/min (standard) (2.3 m$^3$/min) Air curtain unit 40 with nozzle 42 having an opening height of 0.20 in (0.50 cm) through which air flow 44 moves at 6000 ft/min 30 m/sec displaces 500 ft$^3$/min (standard) (4.4 m$^3$/min). Blowers employed in stabilizing systems 12 and 14, including blowers 56 and 72, may be any conventional industrial blower with suitable intakes and capacities to accommodate such flow rates.

Figure 5:
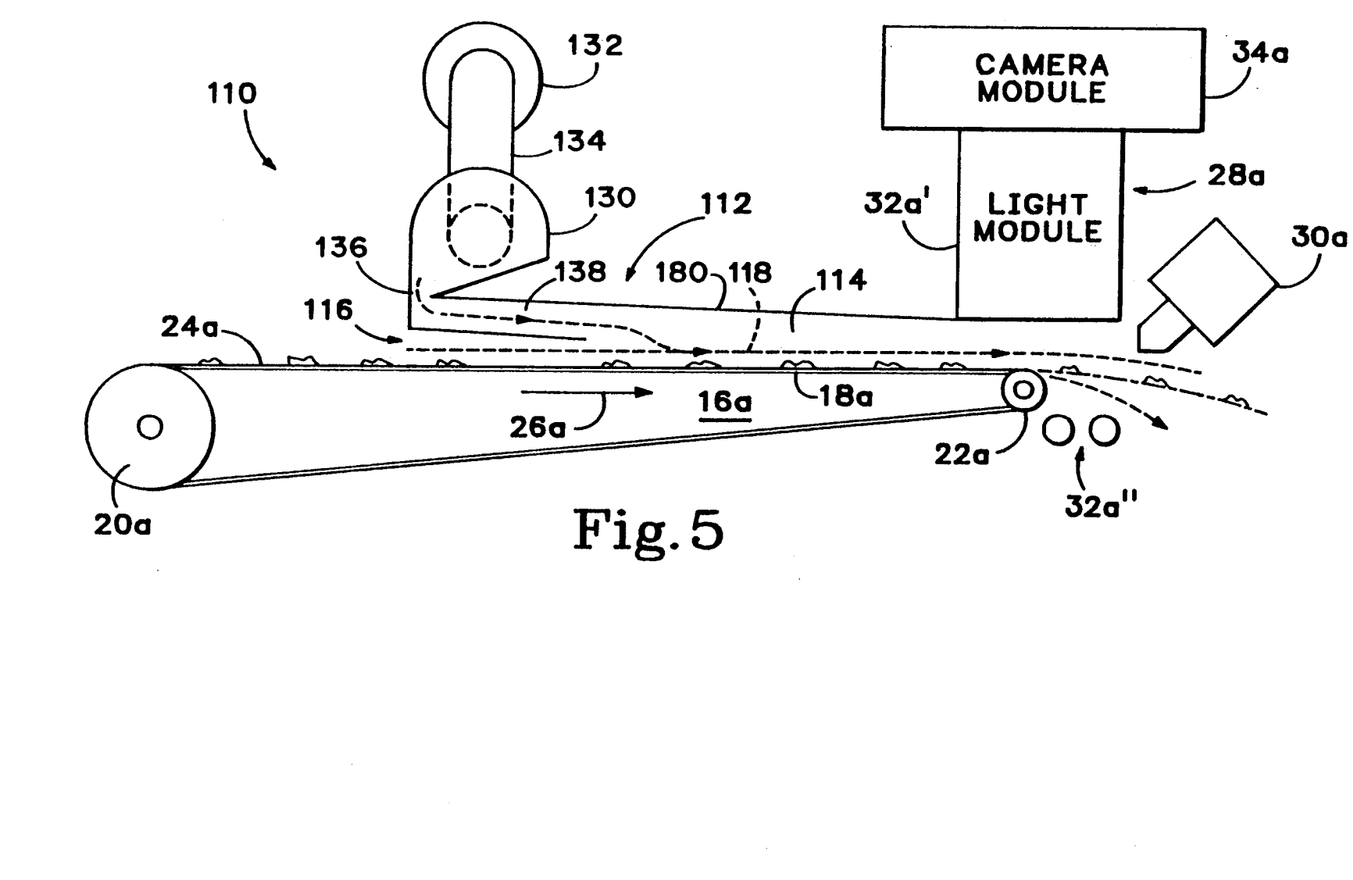
FIG. 5 is a schematic side view of an automated bulk processing system with an alternative embodiment of the stabilizing system of the present invention.

FIG. 5 is a schematic side elevation view of an automated bulk processing system 110 having an alternative stabilizing system 112 of the present invention. Processing system 110 includes components that are substantially identical to those in processing system 10 of FIG. 1 and are identified by the same reference numerals with the suffix "a."

Stabilizing system 112 includes a tunnel 114 that generally encloses upper surface 24a of belt 18a as it extends from a tunnel entrance 116 to optical inspection station 28a. Tunnel 114 allows stabilizing system 112 to generate a flow 118 of fluid, preferably a readily available gas such as air, that passes over a substantial length 120 of belt 18a. Stabilizing system 112 generates air flow 108 in a manner generally the same as that employed by stabilizing system 14.

More specifically, air assist system 112 employs a chamber or plenum 130 that receives air under pressure from a blower 132 coupled via a conduit 134. An adjustable distribution slot 136 in plenum 130 allows air flow 118 to pass to a nozzle 138 positioned above and extending completely across belt 18a within tunnel 114. Stabilizing system 112 provides within tunnel 104 a generally smooth air flow 118 for stabilizing the articles carried on belt 18a to inspection station 28a.

It will be appreciated that air flow 118 is pushed past end roller 22a toward sorting station 30 by nozzle 138. As a result, small or light articles carried by stabilizing system 112 are much less susceptible to incidental boundary layers of air flowing with belt 18a around end roller 22a, thereby reducing the applicability of air curtain unit 40 to stabilizing system 112. Without air curtain unit 40, stabilizing system 112 is better suited for nondusty articles such as, for example, peas.

Figure 6A:
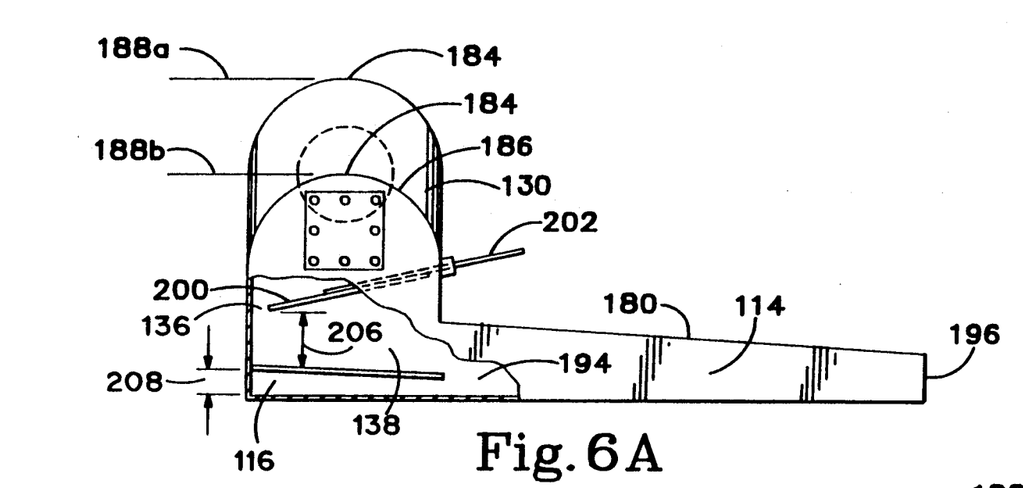
FIGS. 6A-6C show respective side, plan, and front views of components of another of the stabilizing systems shown in FIG. 5.
Figure 6B:
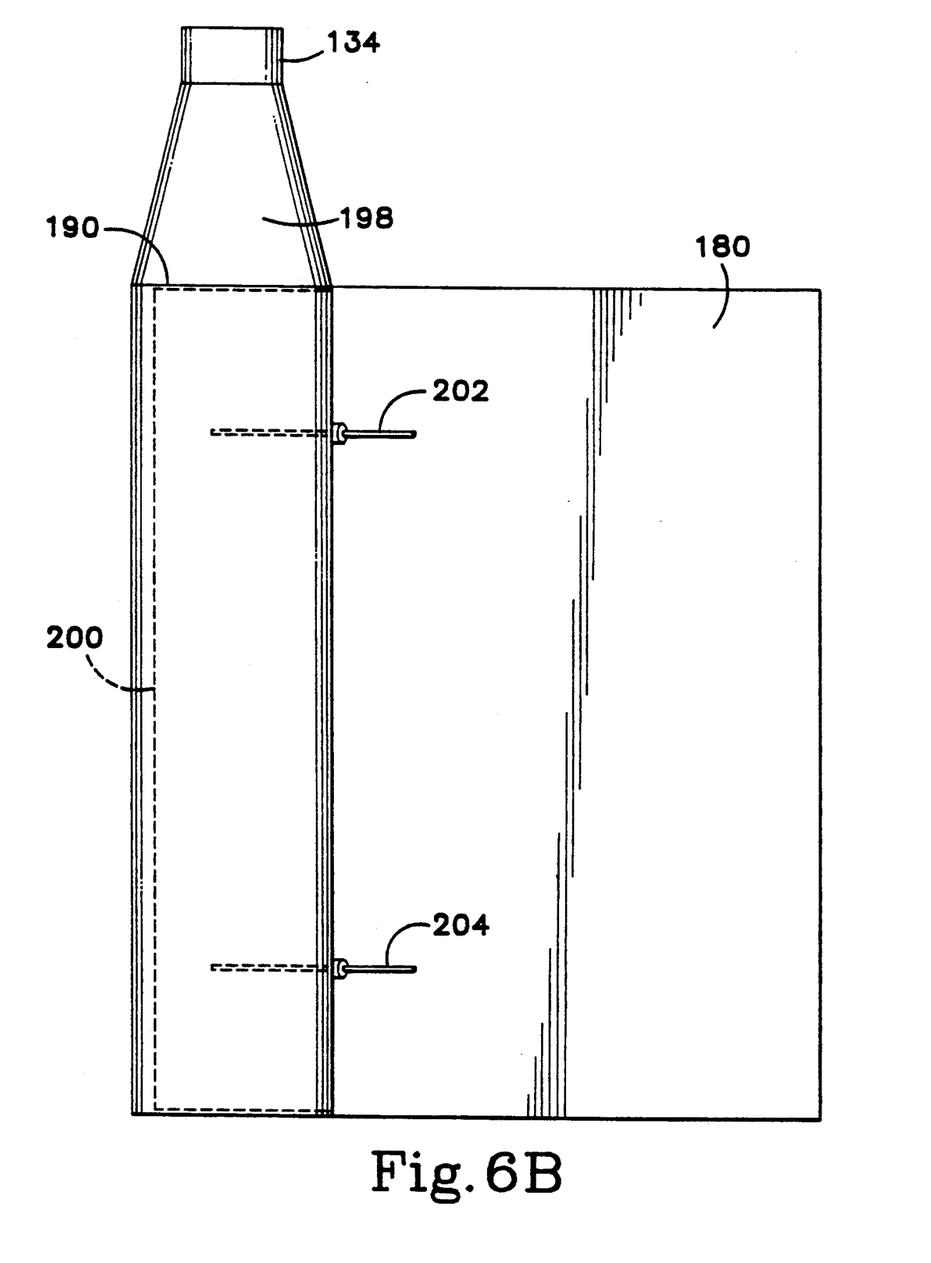
Figure 6C:
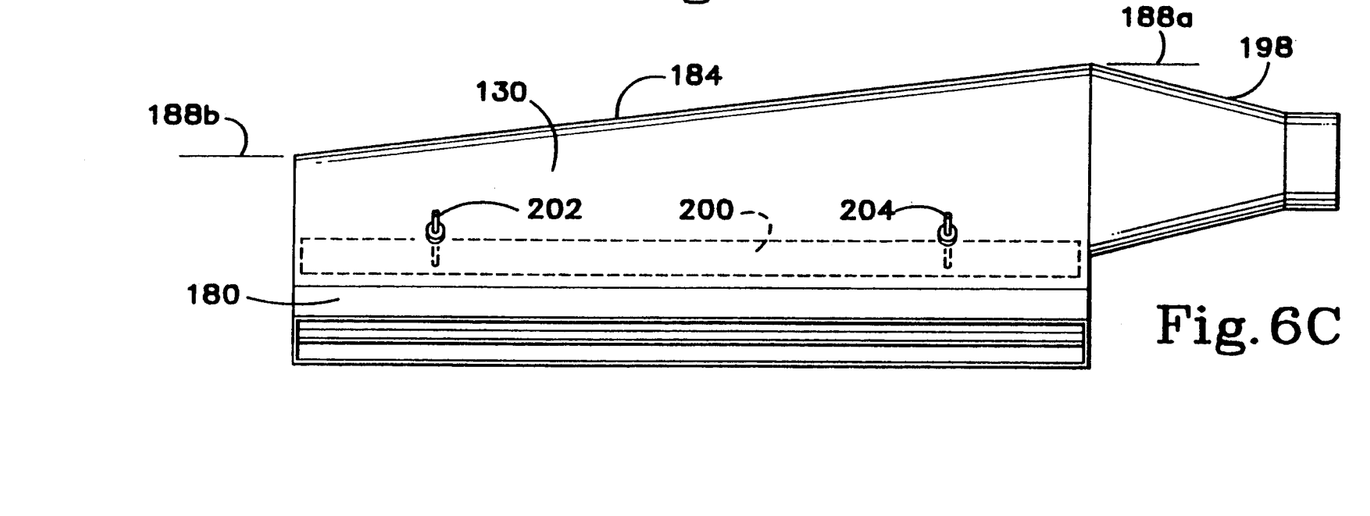

FIGS. 6A-6C are respective side, plan and front views of plenum 130 and a hood 180 that forms tunnel 114 of stabilizing system 112. Plenum 130 has a rounded upper surface 184 that has a generally fixed diameter 186 and tapers from a maximum height 188a at an input end 190 to a minimum height 188b at its opposite end. Similarly, tunnel 114 has a height that varies from a maximum of about 6 in (15 cm) at nozzle opening 194 to a height of about 3 in (6 cm) at an output end 196. A transitioning conduit 198 shaped generally as a conic frustum couples input end 190 of plenum 130 to conduit 134 (FIG. 5). The tapered height of plenum 130 and tunnel 114 improves the uniformity of air flow from nozzle 138 and along belt 18a.

Distribution slot 136 is adjusted by a damper plate 200 supported by a pair of support arms or rods 202 and 204 that extend from plenum 130. Support arms or rods 202 and 204 slide in or out of plenum 130 to move damper plate 200 and change the size of distribution slot 136 to vary the amount and speed of air flow 118 through nozzle 138. Nozzle 138 has a height 206 of about 3 in (7.6 cm) and tunnel entrance 116 has a height 208 of about 1.7 in (4 cm).

Figure 7:
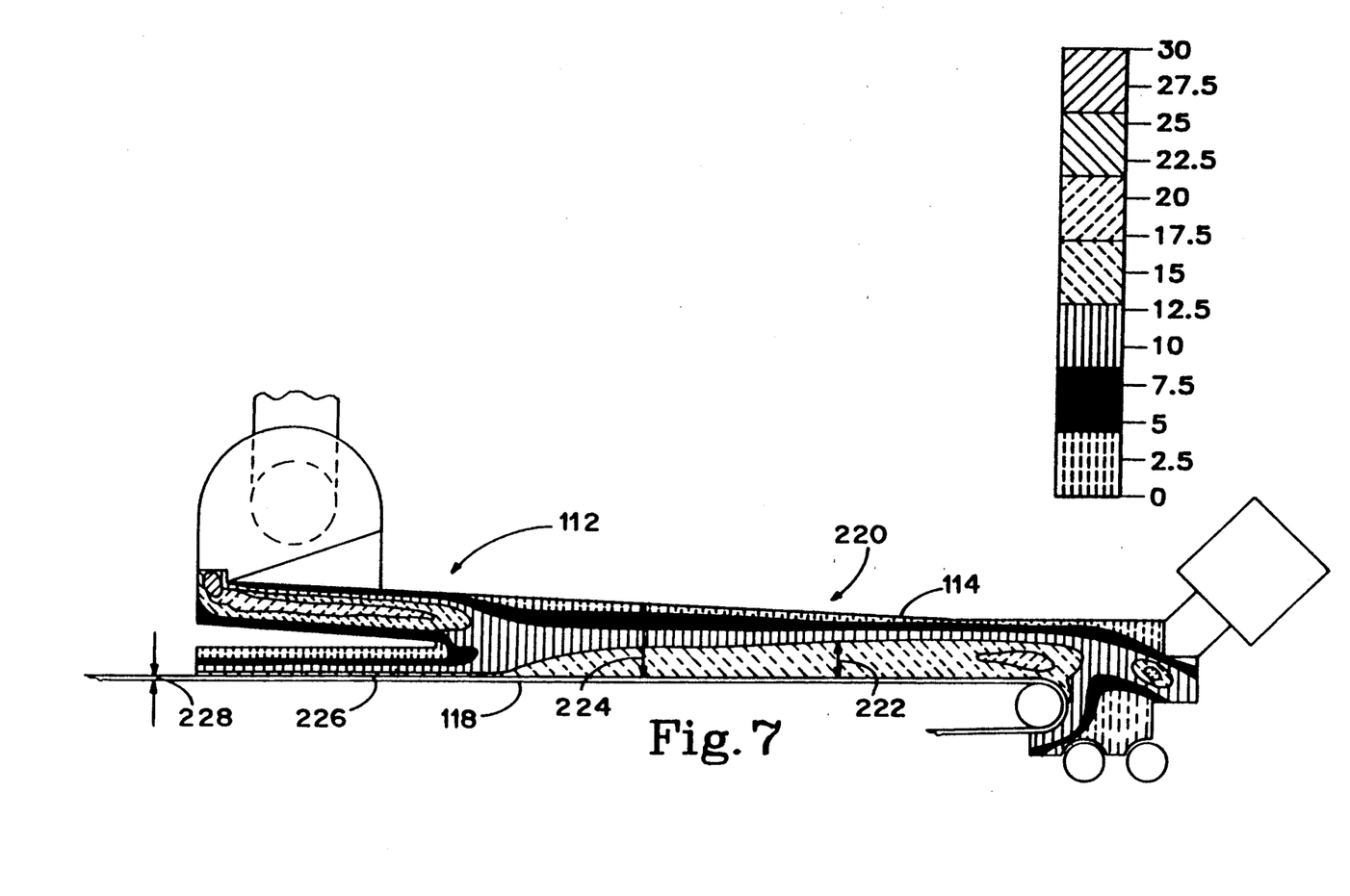
FIG. 7 is a computer-generated plot of air velocities within a stabilizing tunnel shown in FIG. 5.

FIG. 7 is a computer-generated plot 220 of velocities of air flow 118 within tunnel 114 of stabilizing system 112. Velocity plot 220 was generated with finite element analysis software for computational fluid dynamics to represent belt 18a driven at a speed of 15 ft/sec (4.5 m/sec). These conditions represent an exemplary preferred embodiment in which processing system 100 processes wood and bark chips.

Plot 220 shows that air flow 118 within tunnel 114 has a velocity matched to that of belt 18a and extends a height 222 of about 1-2 in (2-5 cm) above belt 18a in tunnel 104 having a height 224 ranging between about 6-3 in (15-6 cm). In contrast, an incidental boundary layer of flowing air 226 generated by belt 18a within tunnel entrance 116 extends a height 228 of a few millimeters above belt 18a. It is believed that boundary layer 226 approximates the boundary layer formed by belt 18a without the fluid assist systems of the present invention.

It will be obvious to those having skill in the art that many changes may be made to the details of the above described preferred embodiment of the present invention without departing from the underlying principles thereof. For example, the stabilizing system of the present invention could employ gases other than air as well as fluids other than gases. The scope of the present invention should, therefore, be determined only by the following claims.

We claim:

1. A conveyor system, comprising:
   a conveyor surface moveable to carry in a selected direction articles positioned on the conveyor surface;

a driving mechanism coupled to the conveyor surface for moving it in the selected direction;

a conveyor hook positioned apart from the conveyor surface to form a tunnel through which the conveyor surface carries the articles, the tunnel having an upstream end and a downstream end past which the conveyor surface carries articles into and out of the tunnel, respectively;

a blower having an input through which a gas is drawn and an output through which passes the gas drawn through the input; and a nozzle adjacent the downstream end of the tunnel in communication with the input of the blower and positioned to draw a flow of gas in the tunnel along the conveyor surface in the selected direction to stabilize the articles on the conveyor surface.

2. The conveyor system of claim 1 in which the nozzle is coupled to the conveyor hood and oriented generally parallel to the conveyor surface.

3. The conveyor system of claim 1 in which the conveyor hood includes first and second ends past which the conveyor surface carries articles into and out of the tunnel, respectively, and the nozzle is coupled to the conveyor hood adjacent its second end.

4. The conveyor system of claim 1 further comprising gas flow adjustment means for adjusting the flow of gas through the nozzle.

5. The conveyor system of claim 1 in which the conveyor surface carries the articles stabilized thereon to optical inspection means for optically inspecting the articles, whereby stabilization of the articles on the conveyor surface facilitates the optical inspection.

6. The conveyor system of claim 1 in which the gas is air.

7. A conveyor system, comprising:

a conveyor surface moveable to carry in a selected direction articles positioned on the conveyor surface;

a driving mechanism coupled to the conveyor surface for moving it in the selected direction;

a conveyor hood positioned over the conveyor surface to form a tunnel through which the conveyor surface carries the articles, the tunnel having an upstream end and a downstream end past which the conveyor surface carries articles into and out of the tunnel, respectively;

a blower having an input through which a gas is drawn and an output through which passes the gas drawn through the input; and a nozzle positioned over the conveyor surface adjacent the upstream end of the tunnel, oriented generally parallel to the conveyor surface, and in communication with the output of the blower to draw a flow of gas in the tunnel through its upstream end and direct a flow of gas in the tunnel over the articles in the selected direction to stabilize the articles on the conveyor surface.

8. The conveyor system of claim 7 in which the nozzle is coupled to the conveyor hood.

9. The conveyor system of claim 7 further comprising gas flow adjustment means for adjusting the flow of gas through the nozzle.

10. The conveyor system of claim 9 in which the gas flow adjustment means includes a slidable damper plate positionable to adjust the flow of gas between the blower and the nozzle.

11. The conveyor system of claim 7 in which the conveyor surface carries the articles stabilized thereon to optical inspection means for optically inspecting the articles, whereby stabilization of the articles on the conveyor surface facilitates the optical inspection.

12. A conveyor system, comprising:

a conveyor surface moveable to carry in a selected direction articles positioned on the conveyor surface;

a driving mechanism coupled to the conveyor surface for moving it in the selected direction;

infeed means positioned above the conveyor surface for feeding the articles onto the conveyor surface with a velocity in the selected direction, the infeed means including a surface over which the articles pass, the surface including an inclined segment oriented at an obtuse angle relative to the selected direction, a discharge end substantially parallel to and adjacent the conveyor surface, and a curved segment between the inclined segment and the discharge end;

an infeed blower having an input through which a gas is drawn and an output through which passes the gas drawn through the input; and a nozzle positioned between the discharge end of the infeed means and the conveyor surface and in communication with the output of the infeed blower to direct a flow of gas along the conveyor surface in the selected direction so that the articles pass from the infeed means to the conveyor surface through the flow of gas, which accelerates the articles in the selected direction.

13. The conveyor system of claim 12 in which the inclined surface is secured in a fixed position.

14. The conveyor system of claim 12 further comprising:

a conveyor hood positioned apart from the conveyor surface to form a tunnel through which the conveyor surface carries the articles;

a second blower having an input through which a gas is drawn and an output through which passes the gas drawn through the input; and a nozzle in communication with the input of the second blower and positioned to draw a flow of gas in the tunnel along the conveyor surface in the selected direction to stabilize the articles on the conveyor surface.

15. The conveyor system of claim 14 in which the conveyor surface carries the articles stabilized thereon to an optical inspection system for inspecting the articles, whereby stabilization of the articles on the conveyor surface facilitates the optical inspection.

16. A conveyor system, comprising:

a conveyor surface moveable to carry in a selected direction articles positioned on the conveyor surface;

a driving mechanism coupled to the conveyor surface for moving it in the selected direction;

infeed means positioned above the conveyor surface for feeding the articles onto the conveyor surface with a velocity in the selected direction;

an infeed blower having an input through which a gas is drawn and an output through which passes the gas drawn through the input; and a nozzle positioned between the infeed means and the conveyor surface and in communication with the output of the infeed blower to direct a flow of gas along the conveyor surface in the selected direction so that the articles pass from the infeed means to the conveyor surface through the flow of gas, which accelerates the articles in the selected direction;

a conveyor hood positioned apart from the conveyor surface to form a tunnel through which the conveyor surface carries the articles;

a second blower having an input through which a gas is drawn and an output through which passes the gas drawn through the input; and a nozzle in communication with the input of the second blower and positioned to draw a flow of gas in the tunnel along the conveyor surface in the selected direction to stabilize the articles on the conveyor surface.

17. The conveyor system of claim 16 in which the conveyor surface carries the articles stabilized thereon to an optical inspection system for inspecting the articles, whereby stabilization of the articles on the conveyor surface facilitates the optical inspection.

* * * * *